US008906513B2

(12) United States Patent
Wu et al.

(10) Patent No.: US 8,906,513 B2
(45) Date of Patent: Dec. 9, 2014

(54) FUSER MEMBER

(75) Inventors: Jin Wu, Pittsford, NY (US); Dante M. Pietrantoni, Rochester, NY (US); Yuhua Tong, Webster, NY (US); David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 459 days.

(21) Appl. No.: 12/966,220

(22) Filed: Dec. 13, 2010

(65) Prior Publication Data

US 2012/0148816 A1 Jun. 14, 2012

(51) Int. Cl.

| | |
|---|---|
| ***B32B 25/08*** | (2006.01) |
| ***B32B 25/20*** | (2006.01) |
| ***B32B 27/20*** | (2006.01) |
| ***B32B 27/34*** | (2006.01) |
| ***G03G 15/20*** | (2006.01) |

(52) U.S. Cl.

CPC .... *G03G 15/2053* (2013.01); *G03G 2215/2041* (2013.01); *G03G 2215/2019* (2013.01)

USPC ........ 428/473.5; 428/421; 428/447; 428/448; 399/333

(58) Field of Classification Search

CPC ........... G03G 15/2053; G03G 15/2057; C08L 2666/20; C08L 79/08

USPC ................ 428/421, 447, 448, 473.5; 399/333

See application file for complete search history.

(56) References Cited

U.S. PATENT DOCUMENTS

| | | | | |
|---|---|---|---|---|
| 4,973,629 | A * | 11/1990 | Williams et al. | 525/432 |
| 5,137,985 | A * | 8/1992 | Chen et al. | 525/431 |
| 5,549,946 | A * | 8/1996 | Iura et al. | 428/35.8 |
| 5,765,085 | A * | 6/1998 | Law et al. | 399/329 |
| 6,939,614 | B2 * | 9/2005 | Tomita | 428/447 |
| 2003/0207078 | A1 * | 11/2003 | Finn et al. | 428/124 |

FOREIGN PATENT DOCUMENTS

JP 2007269936 A * 10/2007

OTHER PUBLICATIONS

Machine translation of JP 2007269936 (2012).*

Yan Wang, Suat Hong Goh, Tai-Shung Chung. Miscibility study of Torlone® polyamide-imide with Matrimid® 5218 polyimide and polybenzimidazole, Polymer, vol. 48, Issue 10, May 4, 2007, pp. 2901-2909, ISSN 0032-3861, 10.1016/j.polymer.2007.03.040.*

* cited by examiner

*Primary Examiner* — Callie Shosho

*Assistant Examiner* — John Freeman

(74) *Attorney, Agent, or Firm* — Hoffman Warnick LLC

(57) ABSTRACT

The present teachings provide a fuser member. The fuser member includes a substrate layer comprising a polyamide-imide/polybenzimidazole polymer blend. A method of manufacturing the fuser member is described.

17 Claims, 3 Drawing Sheets

FUSER MEMBER

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

Thermoset polyimide (PI) is commonly used as fuser belt substrate due to certain properties. Thermoset polyimide has a high glass transition temperature ($T_g$) (about 370° C.) and a high modulus. However, thermoset polyimide is very expensive, and the curing process is long (at least 3 hours) and energy consuming (curing at over 300° C.). This makes thermoset polyimide fuser belts costly and difficult to manufacture. There is a need to reduce the cost.

Other polymeric materials for use as fuser members have been investigated. Polyamideimide (PAI) has been used; however the $T_g$ for PAI is at most 340° C. This lower $T_g$ of PAI makes it a less desirable material for fuser members.

Polybenzimidazole (PBI) possesses a $T_g$ of about 400° C.; however, it is brittle for fuser belt application. There is always a need to explore novel materials to replace PI for fuser belt substrate for manufacturing cycle time reduction (shorter curing time) and manufacturing cost reduction (lower curing temperature).

SUMMARY

According to an embodiment, a fuser member is provided. The fuser member includes a substrate layer comprising a polyamideimide/polybenzimidazole polymer blend.

According to another embodiment, there is described a fuser member including a seamless substrate layer comprising a polyamideimide/polybenzimidazole polymer blend. An intermediate layer comprising a material selected from the group consisting of silicone and fluoroelastomer is disposed on the substrate layer. A release layer comprising a fluoropolymer is disposed on the intermediate layer.

According to another embodiment there is provided a method of forming a fuser belt suitable for use with an image forming system. The method includes coating a composition of polyamideimide, polybenzimidazole and a solvent onto a surface. The composition is cured at a temperature of from about 150° C. to about 290° C. for a time of from about 30 minutes to about 90 minutes to form a belt.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the Figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms “including”, “includes”, “having”, “has”, “with”, or variants thereof are used in either the detailed description and the claims, such terms are intended to be inclusive in a manner similar to the term “comprising.” The term “at least one of” is used to mean that one or more of the listed items can be selected.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of “less than 10” can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as “less than 10” can assume negative values, e.g. −1, −2, −3, −10, −20, −30, etc.

Figure 1:
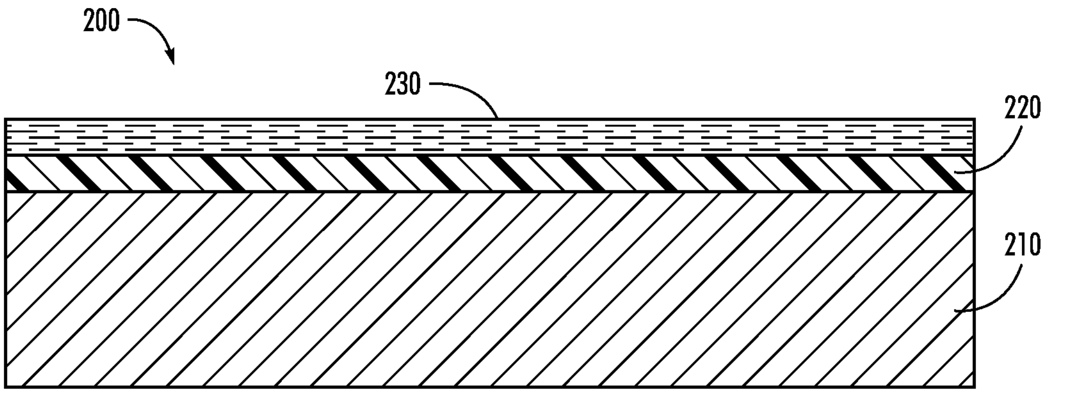
FIG. 1 depicts an exemplary fusing member having a belt substrate in accordance with the present teachings.

The fuser or fixing member can include a substrate having one or more functional intermediate layers formed thereon. The substrate can be formed in various shapes, such as a belt, or a film, using suitable materials that are non-conductive or conductive depending on a specific configuration, for example, as shown in FIG. 1. The substrate described herein includes a belt. The one or more intermediate layers include cushioning layers and release layers. Such fixing member can be used as an oil-less fusing member for high speed, high quality electrophotographic printing to ensure and maintain a good toner release from the fused toner image on an image supporting material (e.g., a paper sheet), and further assist paper stripping.

In FIG. 1, the exemplary fusing member or transfix member 200 can include a belt substrate 210 with one or more functional layers, e.g., 220 and an outer surface layer 230 formed thereon. The outer surface layer 230 is also referred to as a release layer. The belt substrate 210 is described further and is made of a polyimideimide/polybenzimide polymer blend.

Function Layer

Examples of materials used for the functional layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV silicone rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional layer 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR, FOR-LHF®, NM® FOR-THF®, FOR-TFS®, TH®, NH®, P757®, TNS®, T439®, PL958®, BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional layer 220 is from about 30 microns to about 1,000 microns, or from about 100 microns to about 800 microns, or from about 150 to about 500 microns.

Release Layer

An exemplary embodiment of a release layer 230 includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C. These particles are melted to form the release layer.

For the fuser member 200, the thickness of the outer surface layer or release layer 230 can be from about 10 microns to about 100 microns, or from about 20 microns to about 80 microns, or from about 40 microns to about 60 microns.

Adhesive Layer

Optionally, any known and available suitable adhesive layer may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 2A:
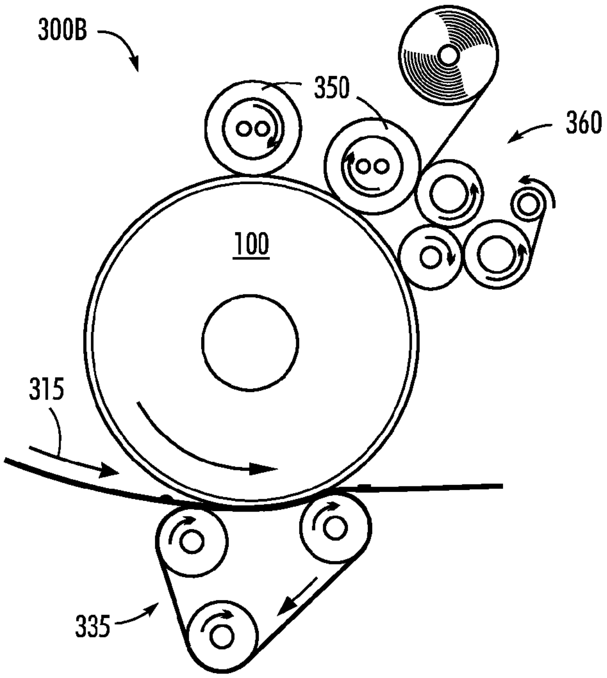
FIGS. 2A-2B depict exemplary fusing configurations using the fuser belt shown in FIG. 1 in accordance with the present teachings.
Figure 2B:
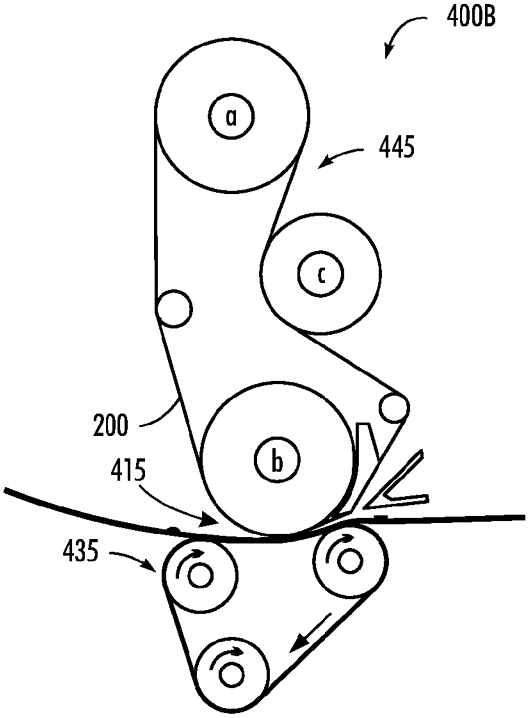

FIGS. 2A and 2B depict an exemplary fusing configuration for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser member 200 shown in FIG. 1 in accordance with the present teachings. The configuration 300B can include a fuser belt 200 of FIG. 1 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configurations 300B can include one or more external heat rolls 350 along with, e.g., a cleaning web 360, as shown in FIG. 2A.

FIGS. 2B depicts the fusing configuration 400B using a fuser member 200 shown in FIG. 1 in accordance with the present teachings. The configuration 400B can include a fuser belt (i.e., 200 of FIG. 1) that forms a fuser nip with a pressure applying mechanism 435, such a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configurations 400B can include a mechanical system 445 to move the fuser belt 200 and thus fusing the toner particles and forming images on the media substrate 415. The mechanical system 445 can include one or more rolls 445*a-c*, which can also be used as heat rolls when needed.

Figure 3:
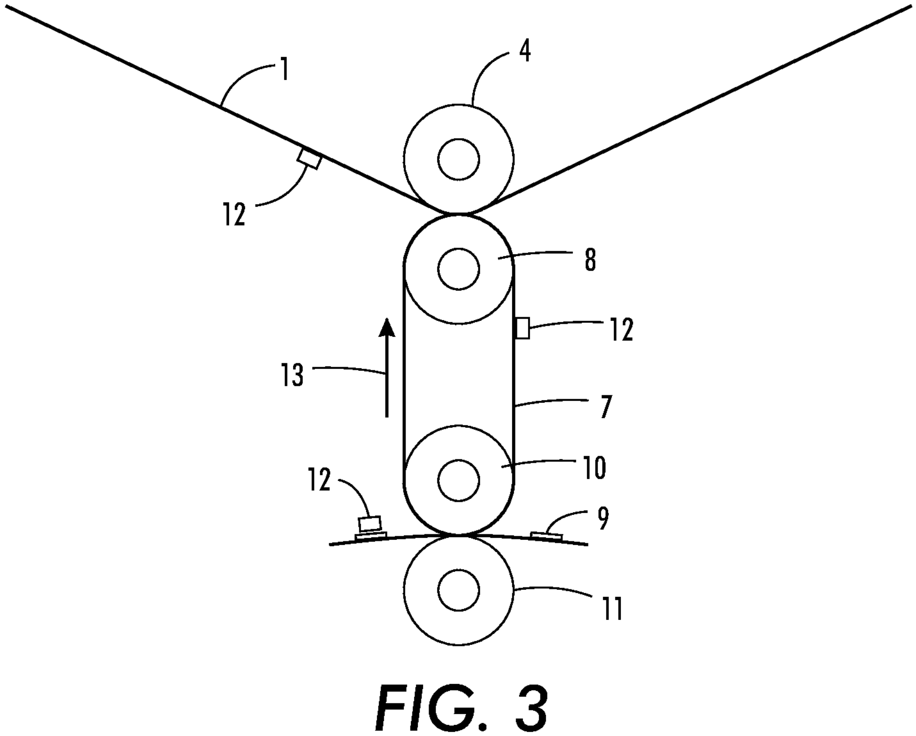
FIG. 3 depicts a fuser configuration using a transfix apparatus.

FIG. 3 demonstrates a view of an embodiment of a transfix member 7 which may be in the form of a belt, sheet, film, or like form. The transfix member 7 is constructed similarly to the fuser belt described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Substrate Layer

Described herein is a polyamideimide/polybenzimidazole polymer blend suitable for use as a substrate layer 210 of FIG. 1.

The polyamideimide (PAI) can be represented by;

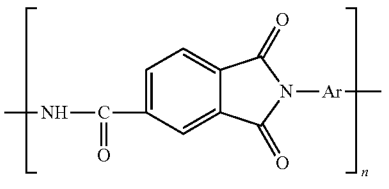

where n represents the number of repeating segments of, for example, from about 20 to about 1,000, from about 100 to about 750, from about 300 to about 700, from about 200 to about 500 and Ar is aryl, with, for example, from about 6 to about 42, from 6 to about 36, from 6 to about 30, from 6 to about 24, from 6 to about 18, from 6 to about 12 carbon atoms.

The number average molecular weight of the polyamideimide is for example from about 5,000 to 50,000, or from about 10,000 to about 25,000, from about 15,000 to about 35,000, or from about 7,000 to about 20,000, and the weight average molecular weight of the polyamideimide is for example from about 10,000 to 200,000, or from about 50,000 to about 325,000, or from about 100,000 to about 300,000 or from about 30,000 to about 100,000, as determined by known methods such as GPC analysis.

Specific PAI examples can be represented by one of;

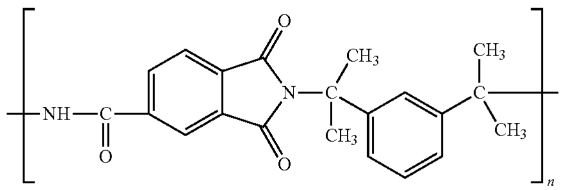

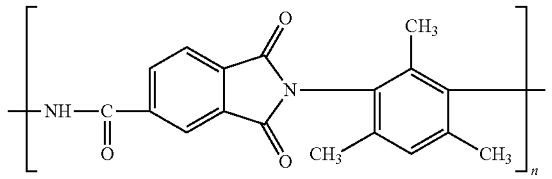

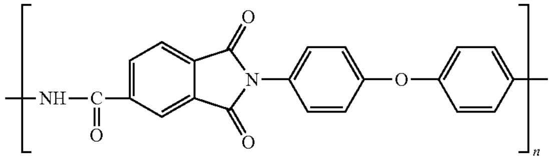

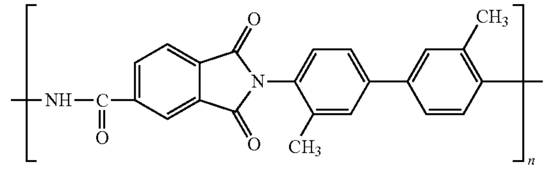

wherein n represents the number of repeating segments and is, for example, as illustrated herein a number of from about 20 to about 1,000 or from about 100 to about 500.

In embodiments, the polyamideimides can be synthesized by at least the following two known methods: (1) the isocyanate method which involves the reaction between an isocyanate and trimellitic anhydride; or (2) the acid chloride method where there is reacted a diamine and trimellitic anhydride chloride. Thus, with the first method, (1), when more than one, such as two, three or four, isocyanates are selected to react with a trimellitic anhydride, a polyamideimide copolymer is formed, and which copolymer can be included in the intermediate transfer member; and with (2) when more than one, such as two or three acid chlorides are selected to react with a trimellitic anhydride chloride, a polyamideimide copolymer is formed, and which copolymer can also be included in the disclosed fuser member. Additionally, polyamideimide homopolymers, polyamideimide copolymers and their blends can also be included in the disclosed fuser members disclosed herein.

Commercial examples of these polyamideimides include VYLOMAX® HR-11NN (15 weight percent solution in N-methylpyrrolidone, $T_g$=300° C., and $M_w$=45,000), HR-16NN (14 weight percent solution in N-methylpyrrolidone, $T_g$=320° C., and $M_w$=100,000), and HR-66NN (13 weight percent solution in N-methylpyrrolidone, $T_g$=340° C.), all commercially available from Toyobo Company of Japan. In this disclosure, the highest $T_g$ PAI, VYLOMAX® HR66NN ($T_g$=340° C.) was picked for demonstration.

The disclosed PBI can be represented by;

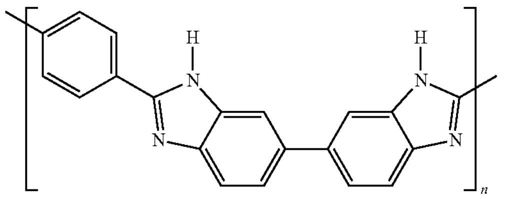

wherein n represents the number of repeating segments and is, for example, as illustrated herein a number from about 30 to about 5,00, or from about 100 to about 400, or from about 200 to about 300.

The number average molecular weight of the polybenzimidazole is for example from about 2,000 to 40,000, or from about 5,000 to about 20,000, or from about 7,000 to about 15,000, and the weight average molecular weight of the polybenzimidazole is for example from about 9,000 to 150,000, or from about 30,000 to about 120,000, or from about 60,000 to about 90,000 as determined by known methods, such as GPC analysis.

The disclosed PBI is commonly prepared by the following reaction:

copper flake, nano diamond, carbon black, carbon nanotube, metal oxide, doped metal oxide, metal flake, and mixtures thereof and/or other types of conductive and semi-conductive powders. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixture thereof can be used as conductive fillers. In various embodiments, other additives known to one of ordinary skill in the art can also be included to form the disclosed substrate layer.

A coating composition is prepared by mixing PAI and PBI and any optional additives in a solvent selected from the group consisting of tetrahydrofuran, methyl ethyl ketone, methyl isobutyl ketone, N,N'-dimethylformamide, N,N'-dimethylacetamide, N-methylpyrrolidone and methylene chloride, where the PAI/PBI polymer blend is from about 5 weight percent to about 40 weight percent, or from about 10 weight percent to about 25 weight percent; and the solvent is from about 95 weight percent to about 60 weight percent, or from about 90 weight percent to about 75 weight percent of the coating composition.

The composition is coated on a substrate in any suitable known manner. Typical techniques for coating such materials

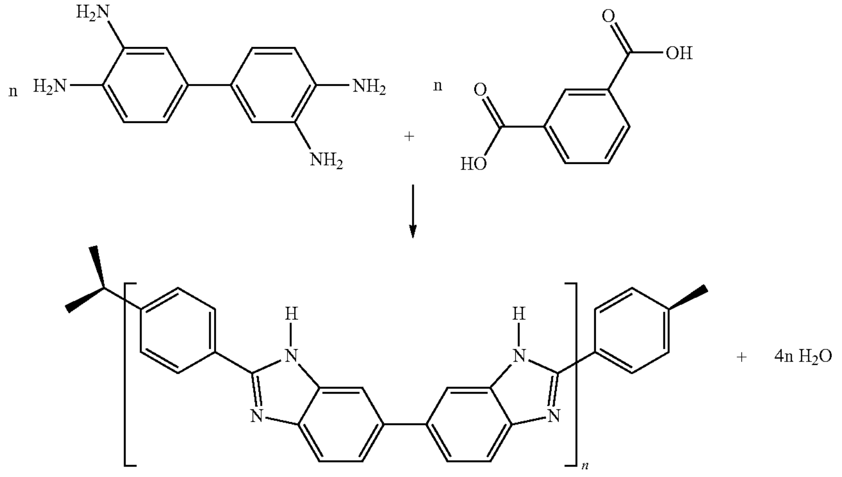

wherein n is from about 30 to about 1500, or from about 100 to about 400, or from about 200 to about 300.

Commercial PBI is available from Boedeker Plastics, Inc., Shiner, Tex. under the trade name of Celazole. In this disclosure a 26 weight percent PBI solution in DMAc (the PBI $T_g$ of about 399° C.) was used in the examples.

The weight ratio of the polyamideimide (PAI) to the polybenzimidazole (PBI) can range from about 20:80 to about 99:1, or from about 30:70 to about 95:5, or from about 40:60 to about 90:10. The composition can also include additives listed below.

Additives and additional conductive or non-conductive fillers may be present in the above-described composition or the various layers of the fuser belt. In various embodiments, other filler materials or additives including, for example, inorganic particles, can be used for the coating composition and the subsequently formed substrate layer. The particles can include, but are not limited to, silicone carbide, aluminum nitride, boron nitride, aluminum oxide, graphite, graphene, on the substrate layer include flow coating, liquid spray coating, dip coating, wire wound rod coating, fluidized bed coating, powder coating, electrostatic spraying, sonic spraying, blade coating, molding, laminating, and the like.

After the composition of polyamideimide, polybenzimidazole solvent and any optional additives are coated onto a surface and cured. The curing of the PAI/PBI composition is at a lower temperature and shorter time than required for polyimides. The temperature for curing the PAI/PBI composition is from about 150° C. to about 290° C., or from about 160° C. to about 200° C., or from about 170° C. to about 190° C. for a time of from about 30 to about 90 minutes, or from about 40 minutes to about 80 minutes, or from about 50 minutes to about 70 minutes to form a belt.

The thickness of the PAI/PBI substrate is from about 20 microns to about 400 microns, or from about 50 microns to about 300 microns, or from about 70 microns to about 150 microns. The Young's modulus of the PAI/PBI substrate is from about 3,000 MPa to about 12,000 MPa, or from about 5,000 MPa to about 9,000 MPa, or from about 6,000 MPa to about 8,000 MPa. The onset decomposition temperature of the PAI/PBI substrate is from about 400° C. to about 650° C., or from about 450° C. to about 600° C., or from about 500° C. to about 580° C.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Experimentally, a PAI/PBI solution was prepared in N-methylpyrrolidone/N,N'-dimethylacetamide=75/15 (weight/weight) at about 13 weight percent solids with the PAI/PBI weight ratio of about 50/50, where the PAI was VYLOMAX® HR-66NN (13 weight percent solution in N-methylpyrrolidone, $T_g$=340° C.) as obtained from the Toyobo Company, and the PBI was Celazole® (26 weight percent solution in N,N'-dimethylacetamide, $T_g$=399° C., and with a weight average molecular weight, $M_w$=30,000) as obtained from Boedeker Plastics, Inc., Shiner, Tex. The solution was coated on a glass plate using draw bar coater, and subsequently cured at 190° C. for 1 hour. The PAI/PBI film was obtained with a thickness of about 80 μm.

The PAI/PBI film was further tested for modulus and onset decomposition temperature. The modulus was about 5,500-6,500 MPa and the onset decomposition temperature was about 561° C. As comparison, the Nitto Denko KUC polyimide belt's modulus is about 6,000 MPa and its onset decomposition temperature is about 530° C. The disclosed PAI/PBI fuser belt substrate possessed comparable properties to the conventional polyimide fuser belt substrate.

When compared with the costly polyimide fuser belt substrate curing process (at least 3 hours, and curing temperature above 320° C.), the disclosed PAI/PBI blend fuser belt substrate is cured at 190° C. for 1 hour, thus significantly reducing the manufacturing cost and cycle time. A PAI/PBI blend for a fuser belt substrate provides an inexpensive alternative to polyimide with reduced manufacturing cost and cycle time.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A fuser member comprising:

a fuser belt substrate comprising a polymer blend consisting of polyamideimide and polybenzimidazole wherein the polyamideimide is selected from the group consisting of:

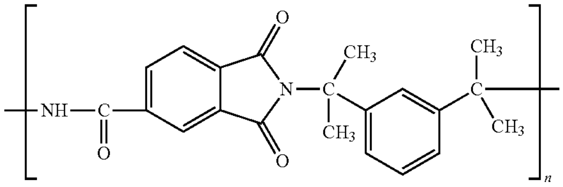

-continued

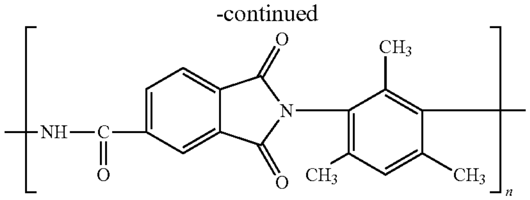

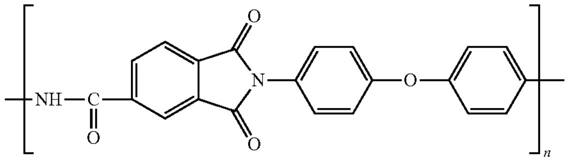

and

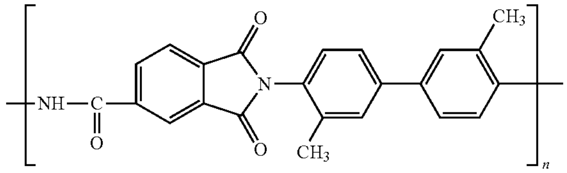

wherein n is a number from about 20 to about 1,000, and wherein the polybenzimidazole is represented by the formula:

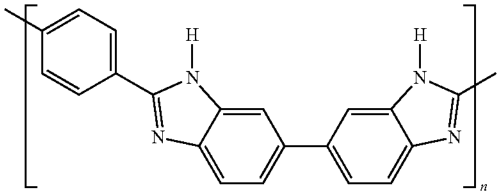

wherein n is a number from about 30 to about 500.

2. The fuser member of claim 1 wherein the polyamideimide and polybenzimidazole are present in a weight ratio of about 20:80 to about 99:1.

3. The fuser member of claim 1 wherein the fuser belt substrate further comprises fillers.

4. The fuser member of claim 3 wherein the fillers are selected from the group consisting of silicone carbide, aluminum nitride, boron nitride, aluminum oxide, graphite, graphene, copper flake, nano diamond, carbon black, carbon nanotube, metal oxide, doped metal oxide, metal flake, and mixtures thereof.

5. The fuser member of claim 1 wherein the fuser belt substrate layer has a thickness of from about 20 microns to about 400 microns.

6. The fuser member of claim 1 wherein the fuser belt substrate layer has a modulus of from about 3,000 MPa to about 12,000 MPa.

7. The fuser member of claim 1 further comprising:

an intermediate layer disposed on the fuser belt substrate; and a release layer disposed on the intermediate layer.

8. The fuser member of claim 7 wherein the intermediate layer comprises silicone.

9. The fuser member of claim 7 further wherein the release layer comprises a fluoropolymer.

10. A fuser member consisting of:

a fuser belt substrate comprising a polymer blend consisting of polyamideimide and polybenzimidazole wherein the polyamideimide is selected from the group consisting of:

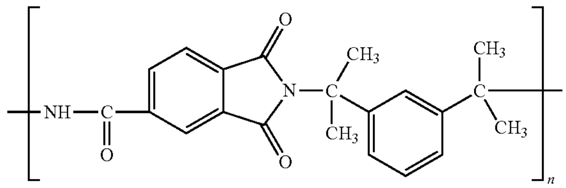
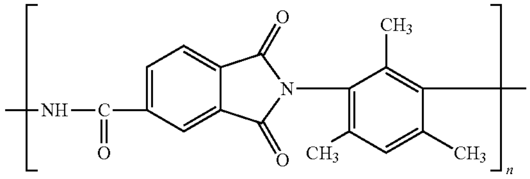
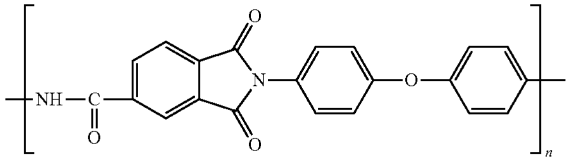

and

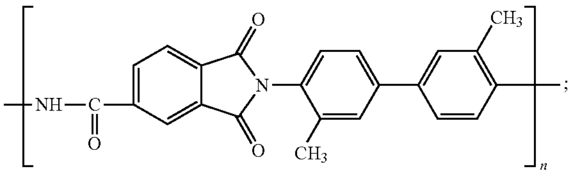
;

wherein n is a number from about 20 to about 1,000, and wherein the polybenzimidazole is represented by the formula:

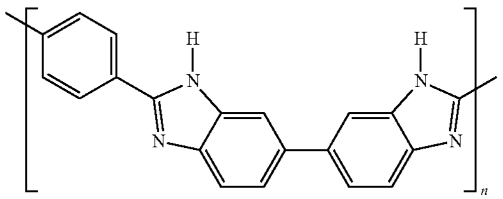

wherein n is a number from about 30 to about 500;

an intermediate layer comprising a material selected from the group consisting of silicone and fluoroelastomer disposed on the fuser belt substrate; and a release layer disposed on the intermediate layer comprising a fluoropolymer.

11. The fuser member of claim 10 wherein the release layer further comprises fillers.

12. The fuser member of claim 11 wherein the fillers are selected from the group consisting of silicone carbide, aluminum nitride, boron nitride, aluminum oxide, graphite, graphene, copper flake, nano diamond, carbon black, carbon nanotube, metal oxide, doped metal oxide, metal flake, and mixtures thereof; and wherein the fluoropolymer comprises a fluoroelastomer or a fluoroplastic.

13. A method of forming a fuser belt suitable for use with an image forming system, comprising:

coating a composition of a polymer blend consisting of polyamideimide and polybenzimidazole, and a solvent onto a surface wherein the polyamideimide is selected from the group consisting of:

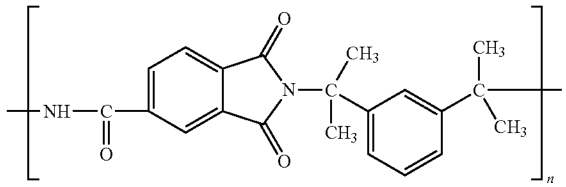
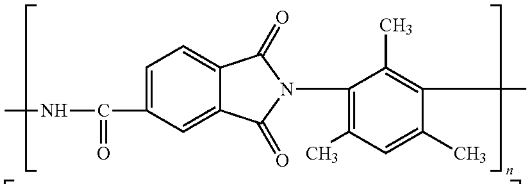
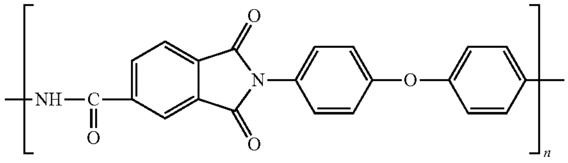

and

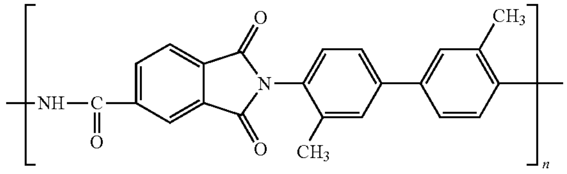

wherein n is a number from about 20 to about 1,000, wherein the polybenzimidazole is represented by the formula:

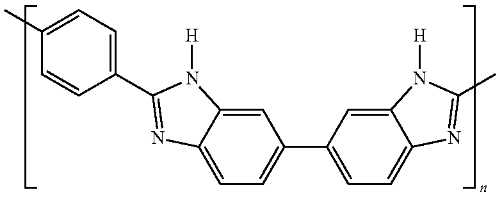

wherein n is a number from about 30 to about 500; and curing the composition at a temperature of from about 150° C. to about 290° C. for a time of from about 30 minutes to about 90 minutes to form a belt.

14. The method of claim 13 wherein the solvent is selected from the group consisting of tetrahydrofuran, methyl ethyl ketone, methyl isobutyl ketone, N,N'-dimethylformamide, N,N'-dimethylacetamide, N-methylpyrrolidone and methylene chloride and wherein the polymer blend of polyamide-imide and polybenzimidazole comprises from about 5 weight percent to about 40 weight percent of the composition and the solvent comprises from about 95 weight percent to about 60 weight percent of the composition.

15. The method of claim 13 further comprising:

coating an intermediate layer on an outer layer of the cured belt, and said intermediate layer comprises silicone.

16. The method of claim 15 further comprising:

coating a release layer on the intermediate layer, and said release layer comprises fillers and a fluoropolymer.

17. The method of claim 16 wherein the fillers are selected from the group consisting of silicone carbide, aluminum nitride, boron nitride, aluminum oxide, graphite, graphene, copper flake, nano diamond, carbon black, carbon nanotube, metal oxide, doped metal oxide, metal flake, and mixtures thereof; and wherein the fluoropolymer comprises a fluoroelastomer or a fluoroplastic.

* * * * *